(12) United States Patent
Lomet

(10) Patent No.: US 7,424,499 B2
(45) Date of Patent: Sep. 9, 2008

(54) LAZY TIMESTAMPING IN TRANSACTION TIME DATABASE

(75) Inventor: David Lomet, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 406 days.

(21) Appl. No.: 11/040,598

(22) Filed: Jan. 21, 2005

(65) Prior Publication Data

US 2006/0167960 A1 Jul. 27, 2006

(51) Int. Cl.
G06F 17/30 (2006.01)

(52) U.S. Cl. .................... 707/206; 707/3; 707/203; 707/205

(58) Field of Classification Search ............ 707/1, 707/3, 206, 200, 100, 205, 203
See application file for complete search history.

(56) References Cited

U.S. PATENT DOCUMENTS

| | | | | |
|---|---|---|---|---|
| 5,893,117 A | * | 4/1999 | Wang | 707/203 |
| 6,125,371 A | * | 9/2000 | Bohannon et al. | 707/203 |
| 6,553,392 B1 | * | 4/2003 | Mosher et al. | 707/204 |
| 6,581,075 B1 | * | 6/2003 | Guturu et al. | 707/201 |
| 6,728,738 B2 | * | 4/2004 | Wolczko et al. | 707/206 |
| 6,912,483 B2 | * | 6/2005 | Frederick | 702/187 |
| 6,934,717 B1 | * | 8/2005 | James | 707/104.1 |
| 2005/0149493 A1 | * | 7/2005 | Yamashita et al. | 707/2 |

* cited by examiner

Primary Examiner—Pierre M. Vital
Assistant Examiner—Dangelino N Gortayo
(74) Attorney, Agent, or Firm—Amin, Turocy & Calvin, LLP

(57) ABSTRACT

Lazy timestamping in a transaction time database is performed using volatile reference counting and checkpointing. Volatile reference counting is employed to provide a low cost way of garbage collecting persistent timestamp information about a transaction by identifying exactly when all record versions of a transaction are timestamped and the versions are persistent. A volatile timestamp (VTS) table is created in a volatile memory, and stores timestamp, reference count, transaction ID, and LSN information. Active portions of a persisted timestamp (PTS) table are stored in the VTS table to provide faster and more efficient timestamp processing via accesses to the VTS table information. The reference count information is stored only in the VTS table for faster access. When the reference count information decrements to zero, it is known that all record versions that were updates for a transaction were timestamped. A checkpointing component facilitates checkpoint processing for verifying that timestamped records have been written to the persistent database and that garbage collection of the PTS table can be performed for transaction entries with zero reference counts.

21 Claims, 13 Drawing Sheets

LAZY TIMESTAMPING IN TRANSACTION TIME DATABASE

TECHNICAL FIELD

This invention is related to databases, and more specifically, transaction timestamping processes in databases.

BACKGROUND OF THE INVENTION

Organizations increasingly rely on computers to retain not only current information but historical information as well at all times. For example, a business may need to know how many items are left on a store shelf, the latest price of a security or the value of a financial portfolio, at any given moment. But in addition, it might need to know the price of a security as of some time in the past, and how many shares of the security were sold at that time. Such information is typically stored and accessed using one or more databases, e.g. a current database and some log of activities against that database. However, a more convenient way of representing this information is frequently to retain it all as part of a transaction time database. A transaction time database retains all past information such that all past database states can be interrogated. Typically, transaction time databases associate a time with each data item stored to facilitate this. Thus, the server needs the capability of determining when data has been safely stored.

A key problem when implementing a transaction time database is how best to associate a timestamp with each version of data that is changed by a transaction. This has been pursued in the art. Lazy, after-commit timestamping seems to offer the best solution. However, this approach can incur high costs in execution time if not performed wisely. Moreover, the persistent information needed for the timestamping can grow very rapidly, and become expensive to access. To keep the persistent information at a reasonable size and readily accessed requires a form of garbage collection which deletes information about a transaction once all its updates have been timestamped.

Garbage collection is a software routine that reclaims space for the general memory pool by searching memory for areas of inactive data and instructions in order to delete or otherwise move the data out. De-allocating memory after a routine no longer needs it is a tedious task, and programmers often forget to do it or do not do it properly. Thus, performing garbage collection at low cost has been a serious challenge in the art.

One standard way of dealing with timestamping in commercial systems supporting only a limited form of versioning, called snapshot isolation, has been to mark versions of data items updated by each transaction with an identifier for the transaction (the transaction ID). When a snapshot read executes, it is given a list (called the commit list) of the transactions that have committed prior to the snapshot execution, and hence whose versions that snapshot read is entitled to see. Such an approach does not generalize to full transaction time support, because it is not possible to provide a commit list for transactions requesting access to an arbitrary past version of the database based on some real time.

A second way of dealing with this problem has been addressed in research prototypes and papers. It involves replacing transaction IDs with time based timestamps. There are several variants of this scheme. The one generally considered most attractive is late, after-commit timestamping. This permits the timestamp to be chosen late in the transaction's execution. The versions of data items updated by a transaction are originally "stamped" with the transaction ID of the updater. After commit, this transaction ID is replaced by the transaction time assigned to the transaction.

To make this timestamping possible, the mapping of transaction ID to timestamp must be made persistent. But that represents a serious cost. If the information is allowed to simply "pile up", this table of persisted information will get very large. There is also a risk that storing and accessing the persisted information will be costly. Thus, it is desirable to garbage collect entries that are no longer needed. Prior solutions have proposed a form of reference counting called persistent reference counting, which can be expensive itself, as this timestamping process has normally been thought of as needing to be logged so that the timestamping is guaranteed to itself be durable (persistent). Thus, there is a substantial unmet need for a mechanism that facilitates more efficient timestamping in a transaction environment.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention herein addresses the problem of timestamping in a transaction time database system by describing a novel technique called volatile reference counting. The invention facilitates a very low execution cost so that performance is minimally impacted in using a transaction time database versus a database system that only retains the current version of data items. The timestamping activity and associated reference counting is not persisted as suggested in the prior art; hence, it cannot be redone should the database system crash. However, database system crashes are infrequent. Thus, only a modest amount of timestamping information will not be garbage collected and need to be retained indefinitely. It is desired to know, however, not only when timestamping is complete, but when it has been made persistent, as well. The volatile reference counting scheme described here provides a low cost way of accomplishing this by identifying exactly when the timestamped versions are persistent.

In support thereof, the invention disclosed and claimed herein, in one aspect, comprises a system that facilitates lazy timestamping utilizing volatile reference counting. The system includes a transaction time database for which the timestamping of record versions is to be performed. When the database is created, a persistent timestamp (PTS) table is created for the database to store stable timestamp information. Conventionally, a reference counting technique is persisted on the database in accordance with the PTS table. However, maintaining such persisted reference count information is costly in terms of system performance.

In order to minimize accesses to the PTS table and persisted reference count information, and hence, provide a more efficient record timestamping process, the subject invention facilitates creation of a volatile timestamp (VTS) table in a volatile memory. Active portions of the PTS table are stored in the VTS table to provide faster and more efficient timestamp processing by accessing the VTS table information. Moreover, reference count information is stored only in the VTS table for faster access and update. When the reference count information decrements to zero, it is known that all record versions that were updates for this transaction were timestamped. In support thereof, the system further includes a reference counting component that facilitates incrementing and decrementing the reference count information stored in the VTS table according to record versions that are timestamped.

However, there still needs to be a mechanism for determining when a timestamped record version has been persisted, rather than still residing in main memory. In another aspect of the subject invention determination is made as to when the data has been persisted by observing the log sequence number (LSN) denoting the end of the log. The system further includes a checkpointing component that facilitates checkpoint processing to provide a technique for verifying when all updated pages that have timestamped records have been written to the persistent database and that garbage collection of the PTS table can be performed.

In another aspect of the invention, a database scanning operation can be performed in the background or during an off-peak transaction time as a backup method which ensures that any record version older than a certain period of time is timestamped. By performing a database scan, the old table entries can always be truncated before the time. This provides an extremely late cleanup of entries that previously would have persisted forever.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
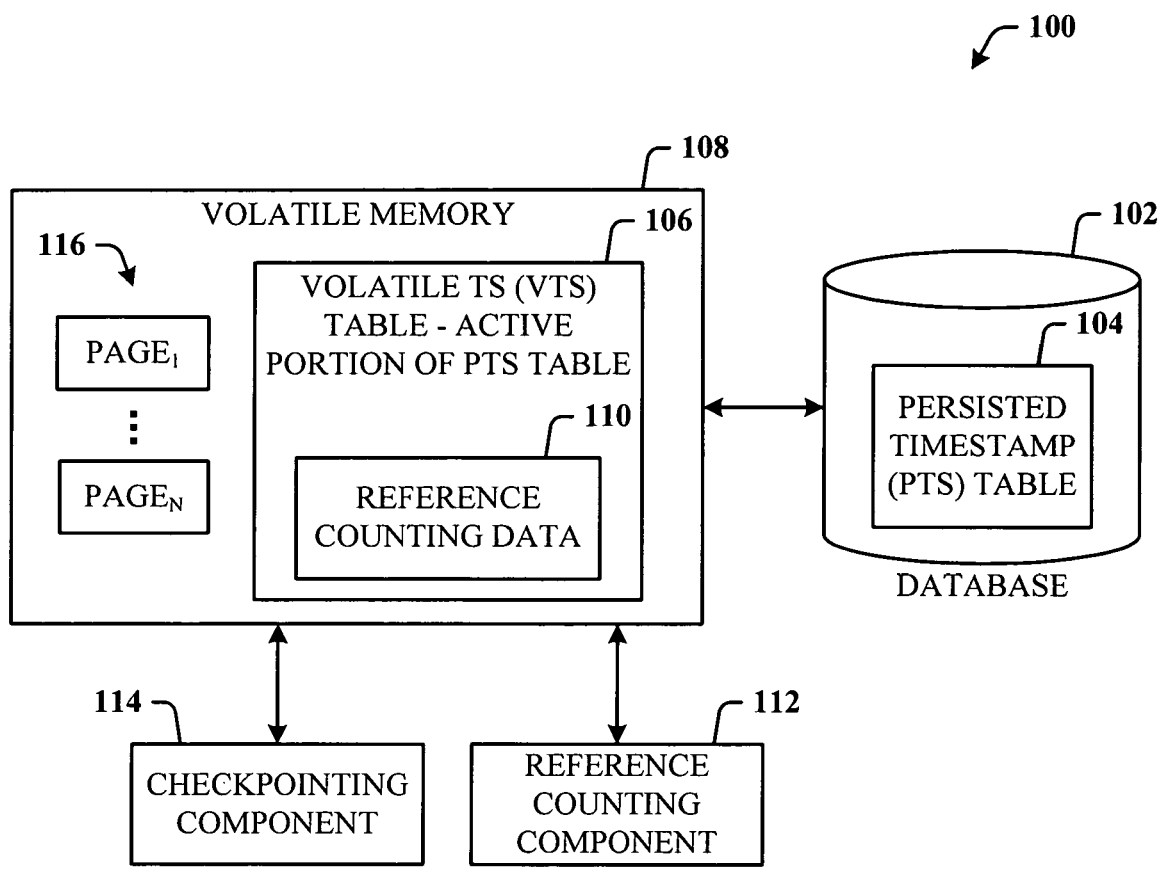
FIG. 1 illustrates a system that facilitates lazy timestamping in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Volatile Reference Counting in a Transaction Time Database

The timestamping technique of the subject invention employs late timestamping to reduce aborts. This means that all record versions which are updated by a transaction are marked with a transaction ID (denoted herein also as TID). The transaction ID is later replaced with the late chosen timestamp. Lazy timestamping is performed after transaction commit to reduce the performance penalty, and particularly to remove timestamping from the response path of transactions. This means the mapping between transaction ID and timestamp needs to be remembered.

A persistent timestamp mapping table (called herein, a PTS table) is provided that maps transaction IDs to timestamps so that the information is available to replace the transaction ID with its timestamp information whenever a version of data that is not yet timestamped is subsequently encountered.

However, a principal problem with this approach is the cost in system performance of interacting with the PTS table. Moreover, it is important to be able to remove a transaction entry from the PTS table when the entry is no longer needed because the timestamping has been completed for the transaction.

The subject invention includes a novel volatile reference counting scheme that facilitates garbage collection for entries in the PTS table and minimizes costs associated with reference counting. The reference counts are stored only in a volatile timestamp (VTS) table, and therein, in association with the transaction ID and its timestamp. The reference count is not logged (or not persisted), which is important for minimizing its cost. This means that reference counts cannot be recovered should the system crash. This is an acceptable compromise given that only a small number of PTS table entries may persist forever because tracking the counts becomes problematic. Databases do not crash often, and so the gradual increase in the size of the PTS table is not a significant cost. Furthermore, PTS table entries for which the timestamping is completed will never be referenced, and hence, will not constitute a serious load on the system.

It is desired to know when the completed timestamping is actually stable in the database. The PTS table entries cannot simply be deleted when their timestamp reference counts go to zero, as the timestamping is not yet stable (persisted to the database). The PTS table entries can only be deleted after it is known that the timestamped record versions are all stable. Thus, a PTS table entry is deleted only after the checkpointing scheme indicates that all the timestamped pages are stable on the disk. Database checkpointing is a method of shortening the time required to recover from a system failure. A checkpoint involves writing cached disk pages that have been updated back to their locations in stable storage. This removes the necessity of having to re-execute the updates that have been logged for these pages. Applying this technique carefully permits recovery to begin reading the log at a later point, i.e., a point denoted by a larger LSN (log sequence number). Comparing this checkpoint LSN with the LSN remembered from a transaction's timestamping activity will indicate when the system can be sure that all timestamping for the transaction has been made persistent. In SQL Server, PTS table entries can be deleted two checkpoints after timestamping has been completed, because all pages that contain updates will have been written back to their stable memory (disk) locations.

When making a choice of time value for the timestamp, usually there is no reason why it cannot simply be the commit time of the transaction. In that case, the timestamp will always agree with the conflict order because the conflict order agrees with commit order (at least for strict locking). However, if CURRENT TIME is requested, the value returned for that request needs to agree with the timestamp. This can lead to an early choice of timestamp. In that case, the system needs to ensure in some other way that the transaction time is later than the time for any prior conflicting transactions.

The final question addressed is exactly when after commit is data timestamped. Whenever a data item version is accessed and it is found not to have a timestamp, the data item is timestamped. It can be convenient to also timestamp all earlier versions of the data, as well. In that way, when a timestamped version for the data item is encountered, it is known that there are no earlier untimestamped versions. All untimestamped data on a page is timestamped under two conditions: (1) when doing a timesplit, all versions going to the historical page are timestamped so that historical pages never need to be updated; and (2) when flushing a page to disk, all committed versions on the page are timestamped as an opportunistic way to make timestamps stable.

In many systems today, significant read activity is isolated from write activity in the form of a data warehouse or separated system. One technique of some transaction processing database systems that is useful for this is support for snapshot isolation, which requires that recent versions of data be retained. Reads are then executed against a recent version, not necessarily the current version. The feature guarantees that readers do not block writers and writers do not block readers. This permits queries running snapshot isolation transactions to read a version of the database as of the time that the transaction starts (actually, as of the time it first accesses data), and to do it without locking because past versions of the data do not change.

Conceptually, each version of a data item d has a start time $(d.TT^-)$ at which it first became the current version of the item, and an end time $(d.TT^-)$ at which it was displaced in that role by a subsequent update or deletion. These times are associated with the transactions that either created the version of the data item or replaced it. For snapshot isolation, these start and end times are usually expressed in terms of which updates (or versions) created by which transactions a query is expected to read. This is called the "commit list" approach. Essentially, only snapshot readers know exactly where their read fits into the transaction serialization order based on the commit list. Other transactions do not have durable precise "timestamps".

A transaction time database retains all prior versions of data in the database, associated with the times at which the data was current in the database. However, for a transaction time database, the commit list approach is no longer viable. Its times must have properties that enable a user of a transaction time database to ask queries of its data regarding not only the current state of such a database, but also any state in the past. Thus, it is required that (1) it is possible to relate the timestamp stored with the data to some notion of user or realtime, thus enabling queries to be made using user-sensible time values, and (2) timestamps for transactions are ordered consistently with the serialization order of the transactions. Thus, if transaction A serializes earlier than transaction B, then the timestamp of A will be less than the timestamp of B.

Early Vs Late Timestamping

Because of these requirements, and especially the second requirement, the timestamp for a transaction is, in most proposals, chosen as late as possible in the execution of the transaction. Ideally, from the viewpoint of satisfying the second requirement, the timestamp is chosen when the transaction commits. The time of commit can, in this case, be used as the timestamp, and because commit order is consistent with serialization order, the transaction timestamps are always correctly ordered.

When SQL CURRENT TIME functionality is supported, users may request the transaction time earlier than the end of the transaction. This can force the timestamp to be chosen (or at least constrained in some way) before the transaction commits. This can lead to the need to abort a transaction when it is no longer possible to ensure that the timestamps chosen agree with the serialization order of the transactions. However, the later that a transaction's timestamp is chosen, the more likely it is that it will be consistent with serialization order, and hence that the transaction will successfully commit.

Thus, even when the timestamp is chosen before commit time, it is chosen as late as possible in the transaction execution so as to maximize the probability of successfully committing the transaction. Because of this, a transaction timestamp will usually not be known when the transaction is doing most of its updating. This means that the data updated by a transaction will need to be re-visited sometime after the timestamp is chosen to enable the data to be correctly timestamped. This has been called the "two touch" problem.

Record processing would be simpler if a timestamp for the transaction could be chosen at its start, and then immediately place the timestamp in all updated data items at the time of update. This would enable completion of the timestamping at the same time the data is accessed for update (a "one touch" solution). But an early timestamp choice entails the risk of an unacceptable number of aborts to keep the timestamp ordering consistent with serialization order. Hence, the challenge becomes one not of avoiding the second touch to timestamp data required by all late timestamping approaches; rather, the problem is how best to optimize the second touch so as to minimize its impact on system performance.

Late timestamping is usually performed as follows. A transaction ID is chosen for a transaction at the start of the transaction. When a data item is updated, the transaction ID is included in the newly-generated version, usually in the same "fields" as will be used to eventually store the timestamp. This permits knowing which transaction is responsible for an update. Later, when choosing a timestamp for the transaction, the transaction ID is mapped to the timestamp, and eventually replaced with the timestamp for that transaction.

Described herein is integration of lazy timestamping into a transaction time database in which timestamps are chosen late in a transaction, perhaps as late as the commit time of the transaction. Because lazy timestamping (after transaction commit) is being performed, the timestamp information for a transaction is desired to be made persistent so that the timestamping can continue until all data updated by a transaction has been timestamped. One of the major concerns is limiting the amount of information that needs to be retained. For that reason, it is desirable to garbage collect timestamp information after all updates of the transaction have been timestamped.

The disclosed innovative timestamping process performs volatile timestamping, in which reference counts and the timestamping process are not guaranteed to be persistent. This greatly reduces the cost of this process, but raises a number of issues with respect to how it is known that timestamping is complete, and how to deal with system crashes. A final "clean-up" process is described that permits limiting timestamp information to transactions that are "not too old".

Late Timestamping Approaches

Two basic late timestamping strategies are possible: eager and lazy. Eager timestamping adds the timestamps to data rather early, though after it has been updated, and always prior to transaction commit. Lazy timestamping adds the timestamps to data rather late and always after transaction commit.

Eager Timestamping. The idea behind eager timestamping is to complete all timestamping activity prior to committing the transaction. While this does not avoid touching updated records twice, the hope is that updated pages are still in main memory at the time that the timestamping occurs, hence, avoiding an extra I/O operation. However, there are a number of difficulties.

The extra I/O will not be avoided should the page be out of the cache.

Timestamping log records of some form are needed to make sure that the timestamping activity can be replayed. In particular, simply because a page contains an update (indicated by the page having an LSN greater than the log record of the update) is not sufficient to conclude that the timestamping has been done.

One needs to be able to distinguish committed from uncommitted records. With this scheme, simply because a transaction's updates are timestamped does not mean that the transaction is committed.

Perhaps most important, the transaction cannot be committed until the timestamping is complete. This can add significantly to the elapsed time that a transaction is active, interfering with concurrency and forcing more overhead to deal with increased lock conflicts.

Lazy Timestamping. The idea behind lazy timestamping is to post the timestamp sometime after commit, at a time when the cost of doing the posting is low, e.g., when an updated page is being accessed in any event. However, there are difficulties with this technique, as well.

There needs to be a way of stably recording the mapping between transaction ID (which is placed in the record at update time) and that transaction's timestamp. This is usually done by maintaining some form of persistent <transaction ID: timestamp> mapping.

This mapping needs to be accessed subsequently when an untimestamped data item is discovered. This may add to the cost at the time of the timestamping.

The amount of this mapping information needs to be controlled, which suggests the garbage collection of transaction entries for which timestamping has been completed.

Despite the challenges with lazy timestamping, the subject invention utilizes this approach.

Extra I/O is avoided which is sometimes required for timestamping before commit as I/O adds to both latency and compute cost. This cost can be very large for transactions that update a large number of records.

Transaction elapsed time is shorter since the system is able to commit the transaction before timestamping, leading to higher concurrency and better performance.

When choosing lazy timestamping, a way is desired to persistently remember the transaction ID to timestamp mapping, at least for all transactions for which timestamping is not complete. Two ways of accomplishing that are explored by selecting one as the preferred approach and then considering further optimization opportunities.

Remembering the Timestamp for a Transaction ID

To keep information persistent in a database system, one technique is to store the information in one of the persistent tables of the database. But there is, in fact, a second way of keeping such information, which is explored first.

Persistent Protocol Table. Database recovery usually maintains an active transaction table as part of the checkpoint information. Implementations of two phase commit maintain information about committed transactions for which participants have not yet acknowledged (or ACK'd) the final commit message. Neither of these structures is stored as a persistent database table. Rather, the information is maintained solely as a volatile table, but backed up with information that is recorded on the log.

The transaction ID to timestamp information can be treated in exactly the same way. This would involve the following elements.

1. The transaction timestamp is put into the commit log record for the transaction, hence making it persistent.
2. A volatile <TID, Timestamp> table is maintained to quickly find the mapping information.
3. Entries of this table are garbage collected in some way to keep the table size manageable. To do this, a reference count can also be employed within the commit record of the transaction.
4. Each checkpoint record stores the contents of this table so that database recovery can recreate the table should the system crash. The table is recreated in a way that is analogous to how the active transaction table is rebuilt by recovery. Recovery then updates the table during the redo log scan, looking for the commit log records of transactions committing since the checkpoint, and looking for information on the log about transactions that may have finished timestamping, and hence, can be deleted from this table.

However, this approach also has some disadvantages.

1. It involves significant changes to the recovery subsystem (e.g., new commit information, new checkpoint information, and changes to redo recovery).
2. The checkpoint has to move forward the entire table at the time of the checkpoint. This can become expensive if the table becomes large. The size is also an issue because the entire table must fit in main memory, where even with virtual memory, paging activity can increase because of its size.
3. Thus, there is increased pressure to aggressively timestamp should the table become too large, in order to reduce its size.

Persistent Database Table. This approach stores the transaction ID to timestamp mapping in the PTS table, which is defined to be a normal database table. The entries of this table that are expected to be used in the near term are cached in volatile memory. This solution has the following elements:

1. A normal PTS table is created when a database is first created.
2. The PTS table is updated in every transaction that updates a transaction time database table. This takes the form of an insert of a new tuple containing the transaction ID and timestamp. This table is indexed by transaction ID. (It is useful for the underlying database system to support base tables that can be organized as a primary B-tree or other primary index.)
3. The active part of the PTS table is cached in volatile memory to speed the timestamping process.
4. Entries in the PTS table are garbage collected via reference counting. When timestamping is complete, the entry for the transaction in the PTS table is deleted via a normal database delete.

With the PTS table, recovery of its information is the same as recovering any other table. Moreover, checkpoint information is unchanged, and the problem of writing a large amount of information to the checkpoint record is avoided. Hence, the absolute size of the PTS table is not so critical, since the PTS table is a persistent database table stored on the disk. Only the active part of the PTS table is cached in volatile memory. This means that the pressure to aggressively timestamp so that the PTS table size can be limited is reduced.

The PTS approach does have some disadvantages, however.

1. An extra database table needs to be updated during the transaction. This requires somewhat more work than the update of a "protocol" table.
2. Normal database update operations are used to log the update. This requires an extra log record, which is more expensive than simply putting the transaction timestamp in the commit record of the transaction.
3. A normal database delete operation needs to be logged when the transaction timestamping is complete and the transaction's entry in the PTS is deleted.

Note that both of the techniques for making the transaction ID to timestamp mapping persistent can usefully involve garbage collecting the entries for which timestamping has completed. It turns out that this garbage collection has some subtleties. In the sequel, garbage collection is described in terms of the PST table, but it can equally be applied to the protocol table approach.

Garbage Collection of PTS Table

It is desired to neither remember nor want to remember forever the mapping from transaction ID to timestamp. Once all the updated records of a transaction have been timestamped, the information is no longer needed. The complete mapping is not remembered because this is a waste of disk space. Thus, garbage collection of PTS table entries is desired.

Reference Counts versus Reference Lists. If eager timestamping was selected, a list of references would need to be maintained of the records needing timestamps. Then, at the end of the transaction, this list is accessed and all the records referenced by it are timestamped. Without the list of references, it would be impossible to complete the eager timestamping in a reasonable amount of time. However, because lazy timestamping was chosen, the reference lists can be replaced with reference counts. Hence, one motivation to do lazy timestamping is that only reference counts need to be remembered.

The lazy approach permits the simple count down of the references as the versions are timestamped (there is no urgency to completing the process promptly). Indeed, the reference counts are maintained solely to garbage collect the PTS table; they are not needed to do the actual timestamping. Additionally, lists take up much more space/transaction than a reference count. Lists permit the completion of timestamping for any transaction at any time, which counts do not support. However, the lazy approach does not require this. Hence, only a reference count for each transaction needs to be maintained of the updated record versions still needing to be timestamped.

Stable Reference Counts

Ideally, it is desired to be completely accurate with reference counts. This ensures that the PTS table entry for every transaction is eventually garbage collected. Because database systems can crash, this would require ensuring that the reference counting is "stable". However, the cost of stable reference counts can be high. The initial reference count for each transaction would need to be logged. Then, as the system timestamped record versions, it would need to log this activity using write-ahead logging. These log records would be outside of any normal transaction. Recovery would then be able to recover timestamping activity, as well as ordinary updates. The recovered timestamping activity is reflected in recovered reference counts, as well. The logging required for stable reference counting is very expensive, potentially doubling the number of log records per transaction (one log record for each update and another for adding the timestamp to the updated version).

Volatile Reference Counts

Database systems are very reliable in that crashes are infrequent in a mature product. This observation allows the conclusion that if timestamping activity is occasionally lost, the only result is that some small number of PTS table entries will not be garbage collected, but rather be persisted for a long period of time. This is a very modest tradeoff for the very substantial gain of not having to write records to the log describing the timestamping activity.

The volatile reference counting and timestamp activity is managed by knowing not only that the timestamping has been done, but that all pages upon which it was done are on the disk, before garbage collecting a table entry from the persistent PTS table. Not logging timestamping activity means that it does not get redone during recovery. Hence, a PTS table entry cannot simply be deleted when its reference count goes to zero.

To perform volatile reference counting, the VTS table is introduced that is like the PTS table, in that, it includes the mappings from transaction ID to timestamp as attributes of the table. The VTS table also includes the reference count of the number of versions updated by each transaction that remain to be timestamped. The VTS table also serves as a cache for portions of the PTS table, permitting the mapping of most transaction IDs to timestamps without actually accessing the PTS table, hence avoiding the cost of accessing the stable medium (disk).

Referring initially to the drawings, FIG. 1 illustrates a system 100 that facilitates lazy timestamping in accordance with the subject invention. The system 100 includes a database 102 for which the timestamping of record versions is to be performed. When the database 102 is created, a PTS table 104 is created in the database 102 for stable timestamp information storage. Earlier work suggested a reference counting technique be employed in the database 102 in accordance with the PTS table 104. However, accessing and updating such persisted reference count information is costly in terms of system performance.

In order to minimize accesses and updates to the PTS table 104 and persisted reference count information associated therewith, and hence, provide a more efficient record timestamping process, the subject invention facilitates creation of a VTS table 106 in a volatile memory 108. Active portions of the PTS table 104 are stored in the VTS table 106 to provide faster and more efficient timestamp processing by accessing the VTS table information. Moreover, reference count information 110 is stored only in the VTS table 106 for faster access. When the reference count information for a transaction decrements to zero, it is known that all record versions that were updates for this transaction were timestamped. In support thereof, the system 100 further includes a reference counting component 112 that facilitates incrementing and decrementing the reference count information 110 stored in the VTS table 106 according to record versions that are timestamped.

The memory 108 caches one or more pages 116 (denoted $PAGE_1, \ldots, PAGE_N$) of the transaction time database. These pages 116 contain the timestamped versions that need to be written. There needs to be a mechanism for determining when timestamped record versions in these pages have been persisted to stable storage, rather than residing only in main memory. The system 100 further includes a checkpointing component 114 that facilitates checkpoint processing to provide a technique for verifying that timestamped records have been written to the stable database and that garbage collection of the PTS table 104 can be performed. Database systems perform checkpointing to shorten the recovery log. In order to shorten the log, it must be ensured that all the updates that occurred before a certain point of time in the log actually are stored as the versions of records in the stable database. This can be measured using the LSN stored in the checkpoint record that denotes the point at which the redo recovery begins reading the log.

The checkpoint process will periodically truncate the log, and move the place where redo recovery begins reading the log later and later in time. Eventually, the checkpoint component 114 causes this place where redo begins reading the log to pass the point where the log was at the time of this last timestamping of records for a transaction. Then, for a transaction with a reference count of zero, this indicates that all the pages timestamped earlier and that hold updates for the transaction have made it to disk. When this is known, the corresponding entry can be deleted from the PTS table 104, because it is known that not only has the timestamping been done, but that the timestamped versions have also been persisted. This is described in more detail infra.

Figure 2:
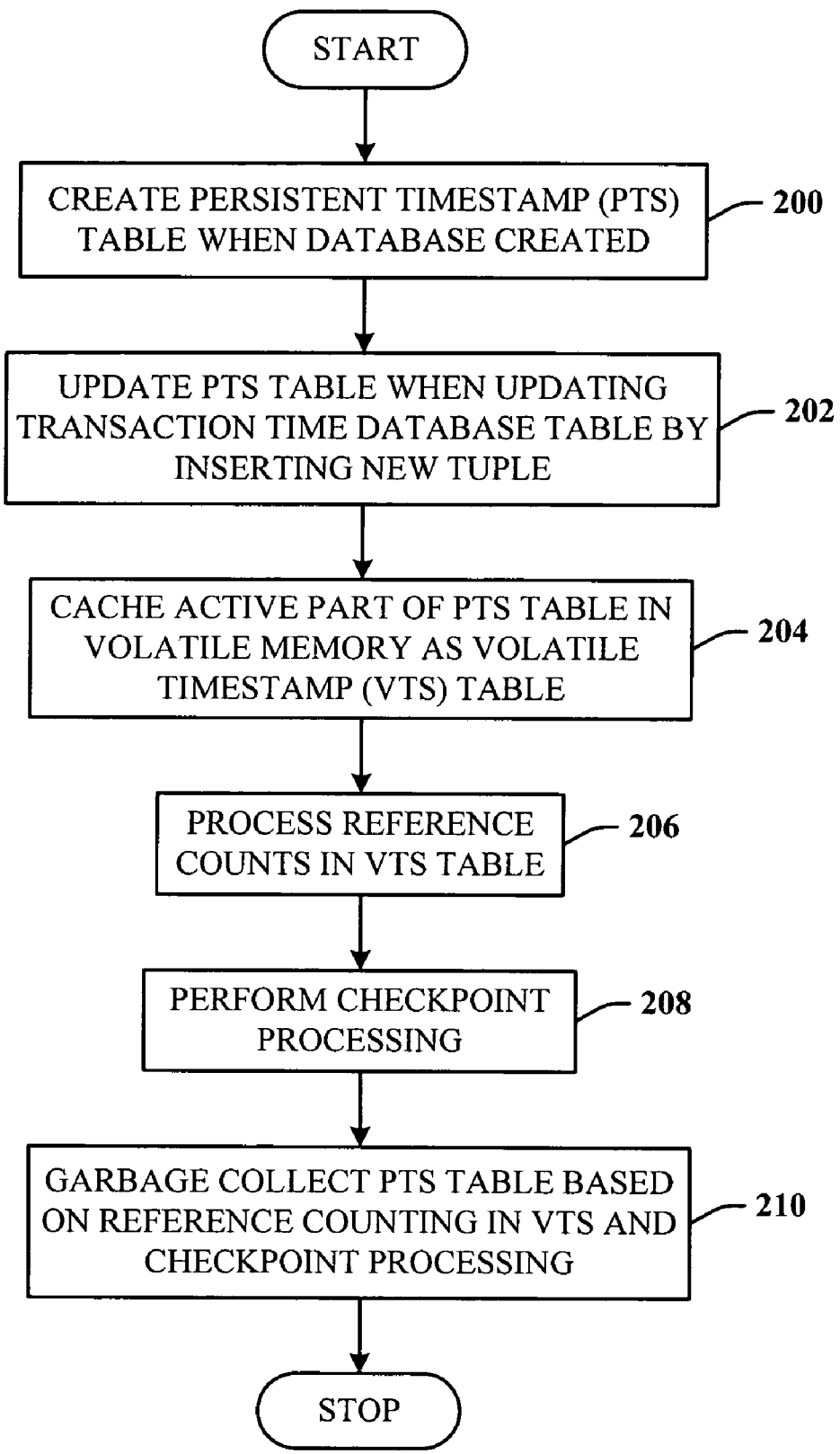
FIG. 2 illustrates a methodology of lazy transaction timestamping in accordance with the invention.

FIG. 2 illustrates a methodology of lazy transaction timestamping in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Proceeding to 200, a PTS table is created when the database is created. At 202, the PTS table is updated when the transaction time database table is updated by inserting a new transaction ID/timestamp tuple. At 204, the active part of the PTS table is cached in a volatile memory as a VTS table. At 206, reference counts are processed in the VTS table. At 208, checkpoint processing is performed. At 210, the PTS table is garbage collected based on reference counting in the VTS table and checkpoint processing.

Figure 3:
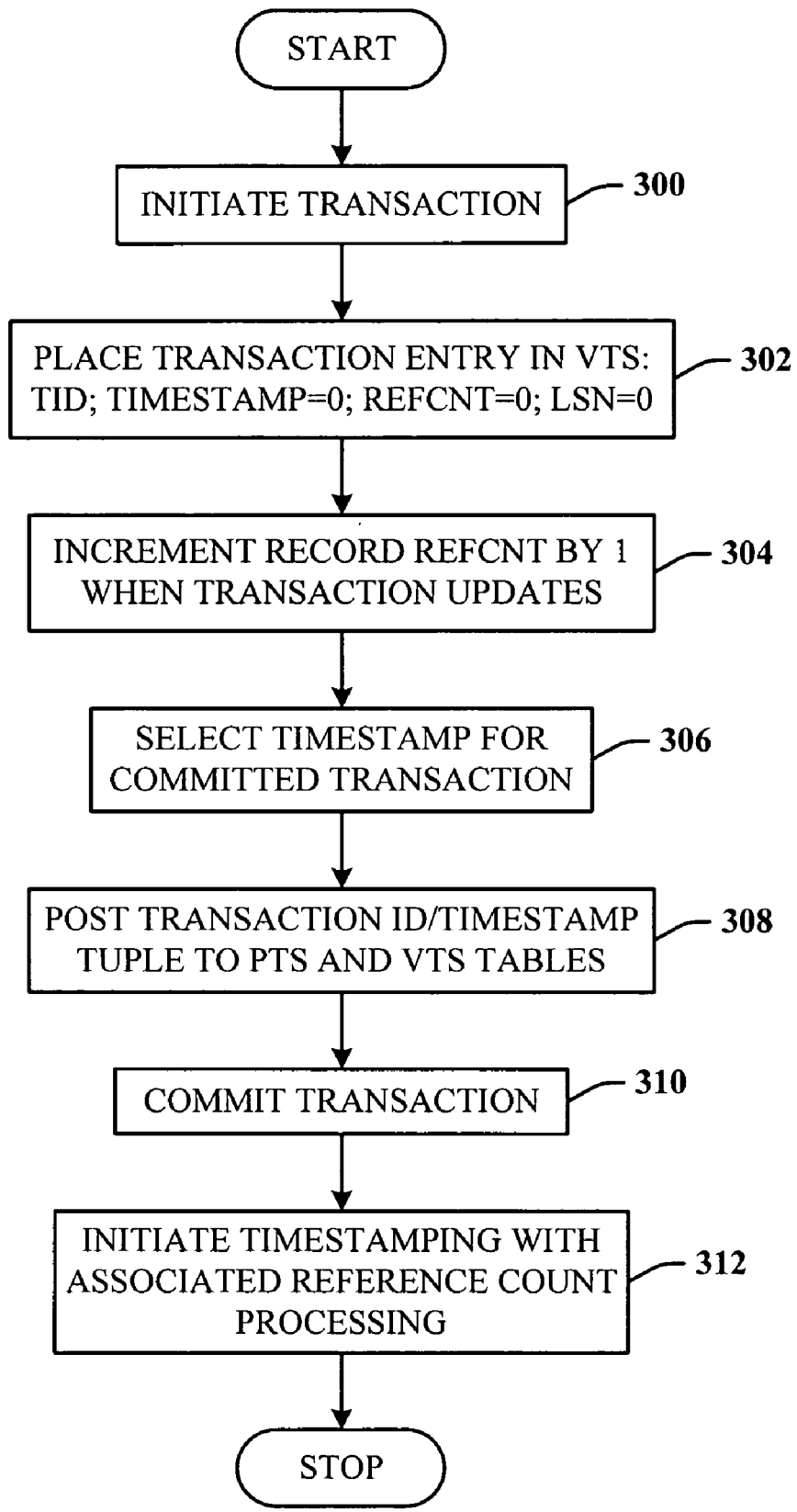
FIG. 3 illustrates a methodology of volatile reference count processing in accordance with the invention.

FIG. 3 illustrates a methodology of volatile reference count processing in accordance with the invention. When a transaction begins, as indicated at 300, an entry for the transaction is placed in the VTS table, as indicated at 302. This entry includes the transaction ID for the transaction (denoted TID), a null value (zero) for timestamp (TIMESTAMP=0), a zero value for reference count (REFCNT=0), since updating is yet to be done and no timestamp activity is needed, and a null value for an LSN attribute (LSN=0).

The VTS table is a hash table that facilitates the accessing of chains of entries that share the same hashed transaction ID. The cost of accessing the VTS table can be made close to a single access (chain length of one) with a sufficiently large hash table. At 304, whenever a transaction updates a record in a transaction time table, the reference count is incremented by one in the transaction's associated VTS table entry. Entries for aborted transactions are simply removed as part of the abort process. Partial rollbacks decrement the reference count for each undone update. The timestamp is chosen substantially at commit time. Essentially, this is before commit time, since the PTS is updated as part of the transaction. Accordingly, at 306, a timestamp is chosen for the committed transaction. At 308, the transaction ID and timestamp tuple are posted to the PTS table, and the timestamp added to the corresponding VTS table entry for the transaction. At 310, the transaction is committed. At 312, timestamping is initiated with the associated reference count processing.

Figure 4:
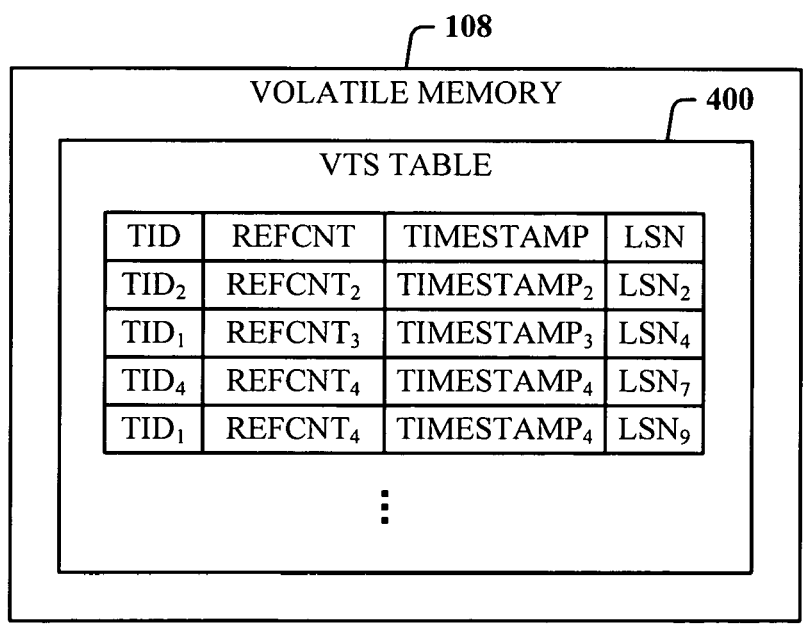
FIG. 4 illustrates an examplary volatile timestamp (VTS) table in accordance with the invention.

FIG. 4 illustrates an examplary VTS table 400 in accordance with the invention. The table 400 (an exemplary implementation of the VTS table 106) is maintained in the faster volatile memory 108 for more efficient access. The table 400 includes at least the transaction ID (denoted TID), reference count information (denoted REFCNT), timestamp information (denoted TIMESTAMP) and LSN information (denoted LSN). The table 400 is a hash table that facilitates accessing entries using their TIDs.

Figure 5A:
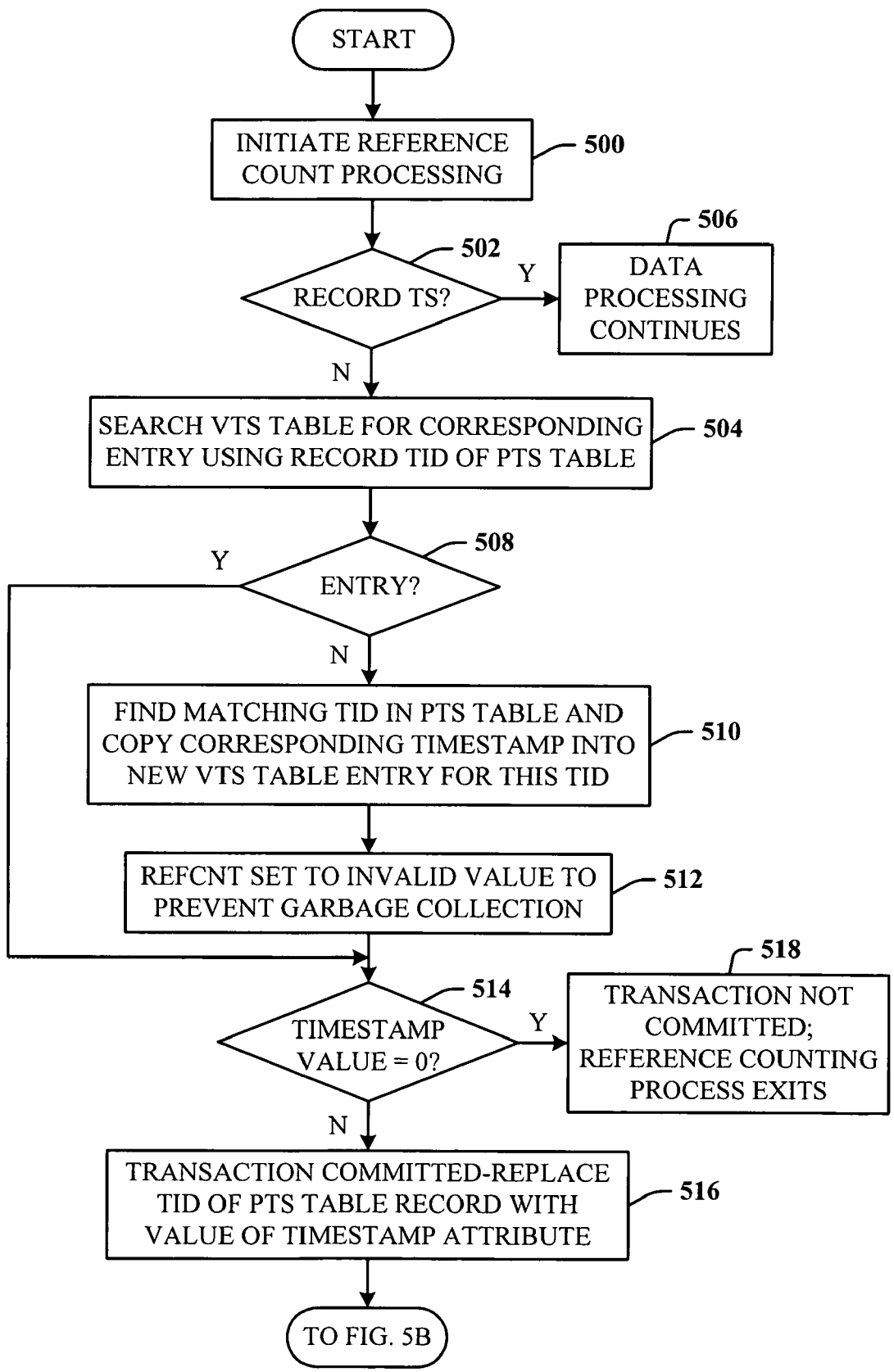
FIGS. 5A and 5B illustrate a more detailed methodology of reference count management in accordance with the invention.
Figure 5B:
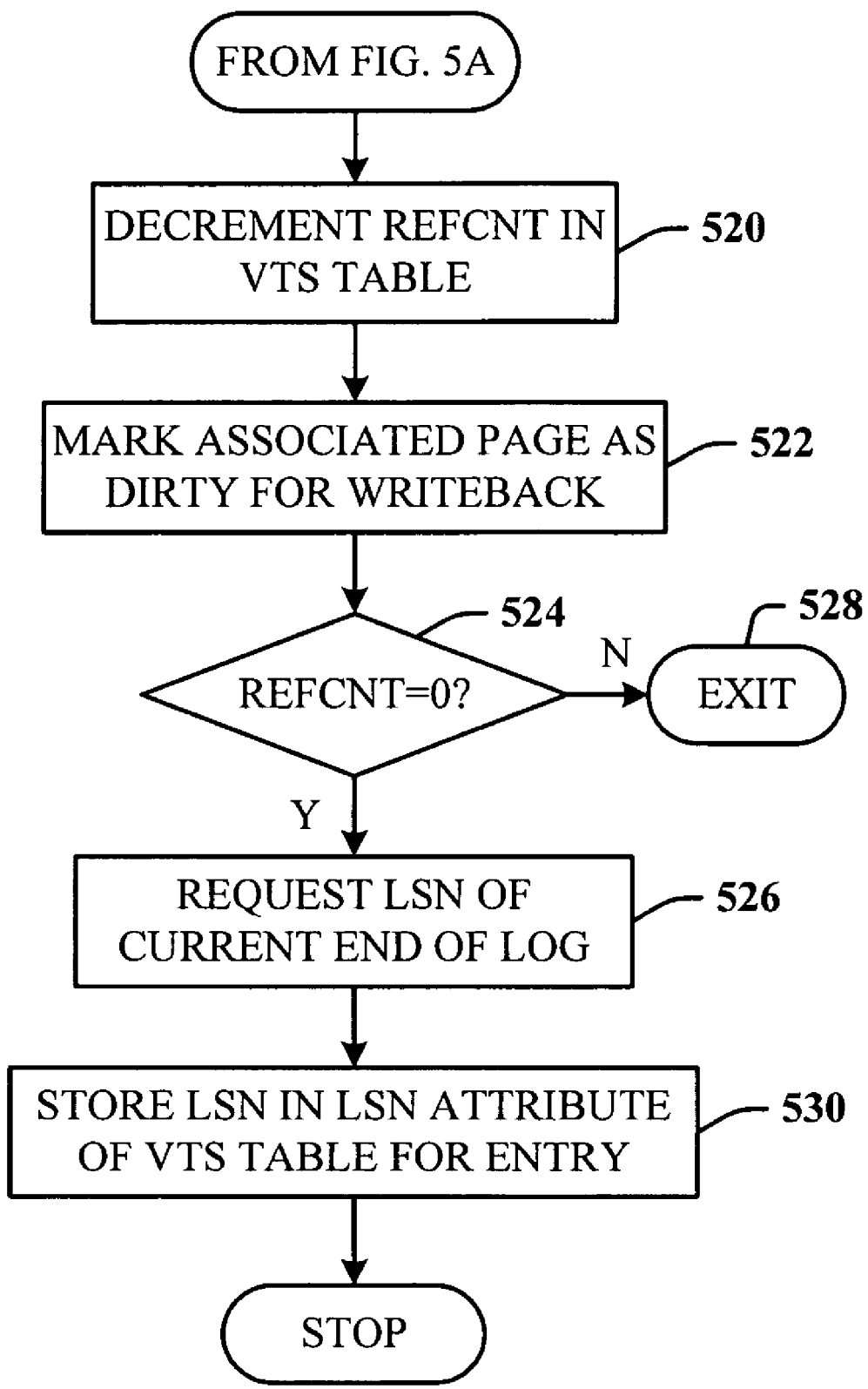

FIGS. 5A and 5B illustrate a more detailed methodology of reference count management in accordance with the invention. Referring now to FIG. 5A, timestamping and reference count processing are initiated at 500. At 502, when a record version without a timestamp is encountered in the transaction time database, flow progresses to 504 where a check is made of the corresponding VTS table entry using the transaction ID of the transaction time database record version. If the record version is already timestamped, proceed to 506 where database processing continues. At 508, if there is no entry for the transaction ID in the VTS table, progress is to 510 where the PTS table entry for the transaction ID is read, and the timestamp copied from its corresponding PTS table entry into a new VTS table entry for this transaction ID. At 512, the reference count (REFCNT) field in the VTS table is set to an invalid value (e.g., a negative number) to prevent the corresponding entry in the PTS table from being garbage collected. On the other hand, if there is an entry in the VTS detected at 508, proceed to 514 to check the timestamp value.

At 514, the system performs a check to determine if the timestamp attribute is equal to zero. If there is a non-zero value in the timestamp attribute, the transaction has been committed, and flow progresses to 516, where the transaction ID in the transaction time table record is replaced with the value of the timestamp attribute in the VTS. If the timestamp in the VTS entry is zero, the transaction has not committed, and the reference counting process exits in 518.

Continuing with FIG. 5B, the reference count in the VTS table entry for the transaction is decremented, as indicated at 520. The page containing the newly timestamped record is marked as "dirty" so that the cache manager will write it back when the page leaves the database cache, as indicated at 522. At 524, a check is made to determine if the REFCNT is zero. If the reference count goes to zero, flow is to 526 to request the LSN of the current end of the log. If the reference count is not zero, the reference counting process exits, as indicated at 528. At 530, the LSN value is stored in the LSN attribute for this entry of the VTS table. A reference count of zero means that no more timestamping is required for that transaction. Timestamping activity and reference counting are now complete.

Checkpoints and Garbage Collection

A checkpoint action changes the redo recovery scan start point. This start point is indicated by an LSN, essentially the log address of the first log record that should be checked to see if redo is needed. A checkpoint accomplishes this by writing updated (dirty) pages to the disk, hence making them stable. In the SQL Server penultimate checkpoint scheme, as soon as two checkpoints have occurred since a transaction's reference count has gone to zero, all of its timestamped pages will be stable on disk. At that point, the transaction's LSN attribute in its VTS table entry will be less than the LSN for the redo recovery scan start point.

Figure 6:
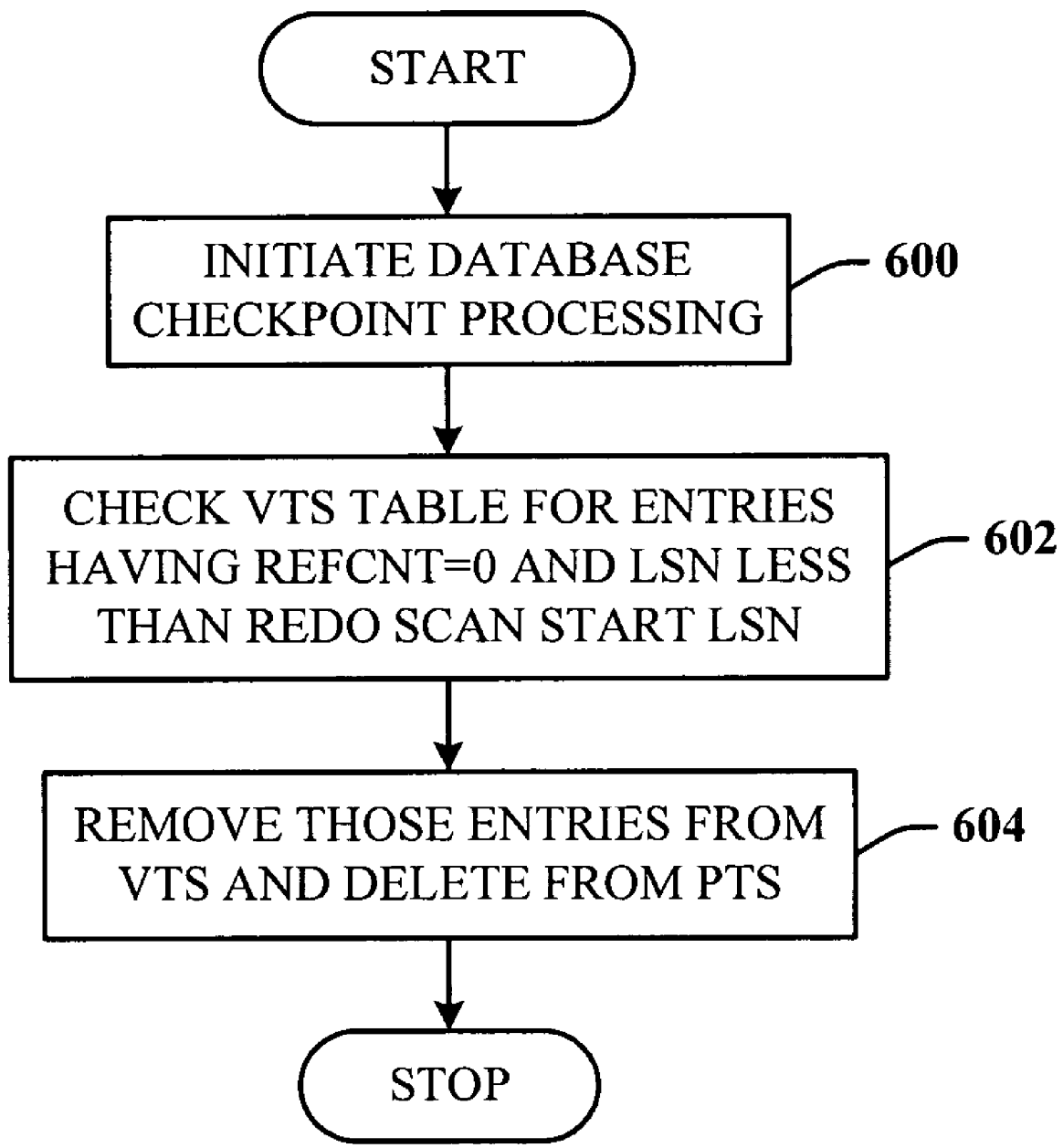
FIG. 6 illustrates a methodology of checkpoint processing in accordance with the invention.

FIG. 6 illustrates a methodology of checkpoint processing in accordance with the invention. At 600, a database checkpoint is performed. At 602, whenever a system checkpoint is performed, the VTS table is checked for zero reference count entries whose LSN's are less than the LSN of the redo recovery scan start LSN. At 604, it is those entries that are removed from the VTS table and deleted from the PTS table. The PTS table entry's delete is processed within a system transaction.

Using volatile reference counts has essentially a zero cost. Most of the timestamping cost is in the actual revisiting of records and inserting timestamps. This is decidedly not the case for persistent reference counting.

Crashes and VTS Entries

When the system crashes, the VTS table is lost. Reference counts for transactions that have not been fully timestamped are lost. The result is that the PTS table entries for these transactions cannot be garbage collected, but rather can live forever. As indicated previously, when reading an entry from the PTS table into the VTS table, since a transaction ID is not found in the VTS table, the reference count is set to a negative number to prevent garbage collection in the PTS table. This means that the reference count for this entry will never be zero due to a decrementing reference count value.

It is not a serious problem for PTS table entries for transactions with crash interrupted timestamping to live forever, since crashes are not common. The PTS table will grow very slowly, on the order of a few hundred to a few thousand entries per system crash in a very high performance system. Moreover, PTS table entries are small, approximating twenty bytes. Thus, a few thousand entries would approximate 50K to 100K bytes per crash. One crash a day is thus, not more than about 35 MB of PTS table per year. Furthermore, ten years is not more than 350 MB of data. These are decidedly worst case bounds. Production systems rarely crash more than once a week. Only high performance systems would have thousands of transactions per crash with interrupted timestamping.

Dealing with Remaining PTS Table Entries

While all PTS entries cannot be garbage collected using volatile timestamping, there are, in fact, other ways to eliminate these entries. The basic underlying idea is to be able to ensure that transactions whose time is older than some earliest time are fully timestamped. At least two ways of doing that are described, as follows.

It can be useful to do a sweep of a database in a prior art process called "vacuuming" to make sure that everything is timestamped. If all pages are forced to timesplit so that no page has a temporal extent beyond some maximum, and entries in historical pages are always timestamped resulting from such splits, then transactions further in the past than the temporal extent will all be timestamped. Ensuring that transactions that are sufficiently old are all timestamped means the elimination of transaction entries from the PTS table that are older than that. The PTS table can be scanned removing entries whose timestamp is earlier than the oldest unstamped transaction. There are good reasons for wanting to timesplit pages to limit temporal extent. One reason is to facilitate index page splitting in a timesplit B-tree (or TSB-tree), while another is that doing forced timesplits enables use of the historical pages as a backup for the current database.

Timestamping Versions

As indicated supra, volatile reference counting for garbage collecting the PTS table entries is a very small part of the cost of timestamping. Most of the timestamping cost is in accessing the records to be timestamped and actually updating the timestamp attribute with the transaction's time. A goal is to minimize this cost. This means that the effort in accessing records and the need for timestamping should be minimized. Finally, it is also important to avoid any need to read in a page from disk in order to timestamp its records. Following is a description of how to keep the timestamping costs low by exploiting these observations.

Timestamping During Version Access

It is desired to avoid a separate access to a record version solely for timestamping. Rather, the record versions are timestamped when encountering them while accessing versions during the normal course of executing subsequent transactions. This means that when first accessing the version, it might not be timestamped. This version should not be passed on for ordinary processing until it has been timestamped, lest it result in confusion subsequently.

Figure 7:
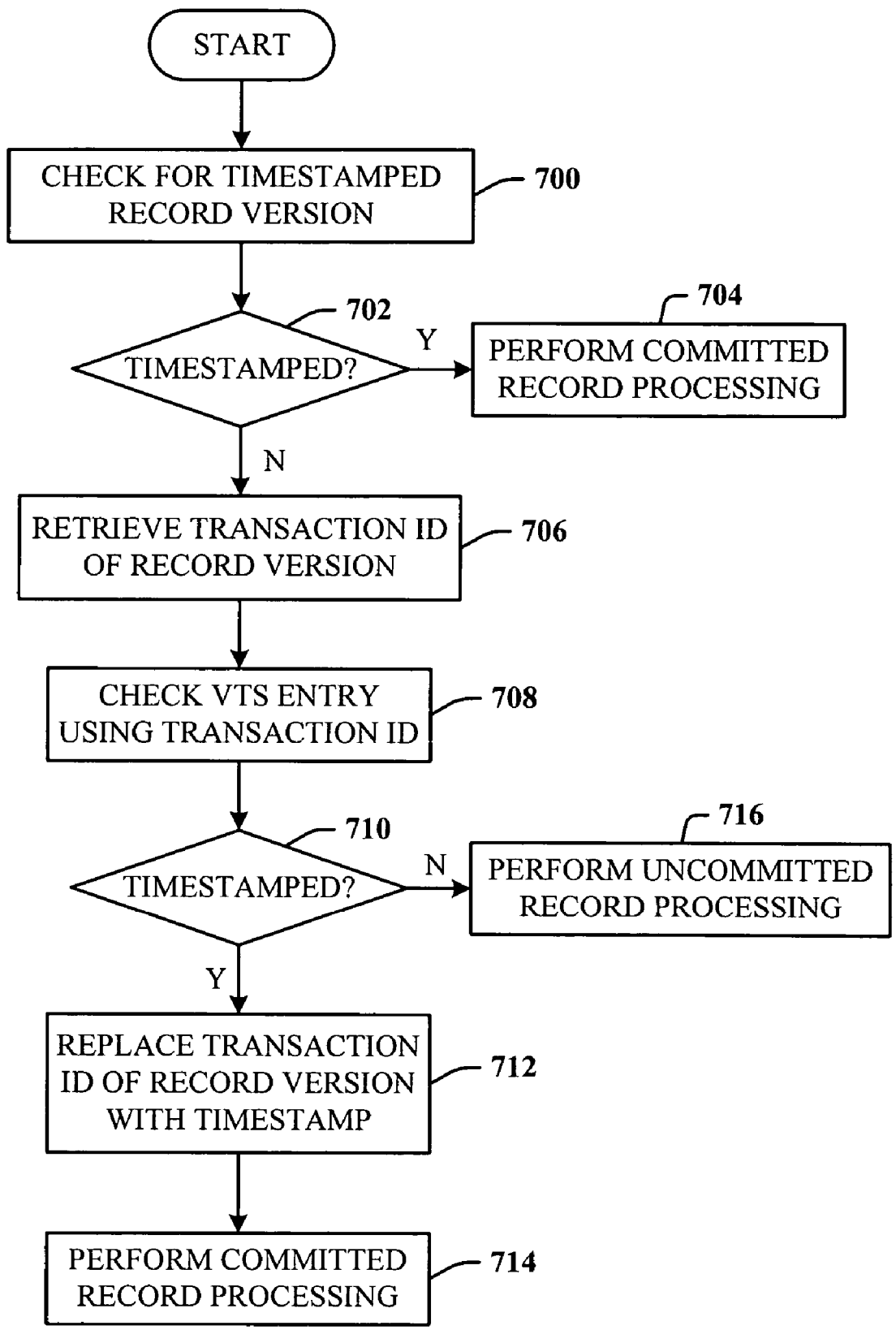
FIG. 7 illustrates a methodology of timestamping during version access in accordance with the invention.

FIG. 7 illustrates a methodology of timestamping during record version access in accordance with the invention. What needs to be understood is the state of a record version in a transaction time database. When it is timestamped, it is clear that the record version represents the result of a committed update. However, when it is not timestamped, it may be uncommitted, but it is also possible for it to have been committed but not yet timestamped. Proceeding to 700, a check for a transaction timestamp is performed for a record version in a transaction time database. If the record version is timestamped, at 702, committed record processing is performed, as indicated at 704.

On the other hand, whenever encountering a record version in the transaction time database that has not been timestamped, progress is from 702 to 706 to check whether the record version is committed or uncommitted. This begins by retrieving the transaction ID of the record from the record version. Its entry in the VTS table is then accessed using the transaction ID, as indicated at 708. At 710, if the corresponding VTS table entry is timestamped, the transaction ID of the entry in the transaction time database is replaced with the timestamp, as indicated at 712. Flow is then to 714 to perform committed record processing. If there is not a timestamp with the VTS table entry, the transaction creating the record version has not yet been committed. Thus, flow is from 710 to 716 for uncommitted record processing.

During normal transactions, locking prevents accessing uncommitted record versions. In this case, if a record can be accessed during such a transaction, it is known to be committed, regardless of whether it is timestamped. If not timestamped, the VTS table is consulted and the appropriate timestamping performed. During snapshot transactions, queries execute without locking, and it is not known whether a record version without a timestamp is committed. In this case, the VTS table is consulted to determine commit status. Timestamping is also performed, as described above.

Figure 8:
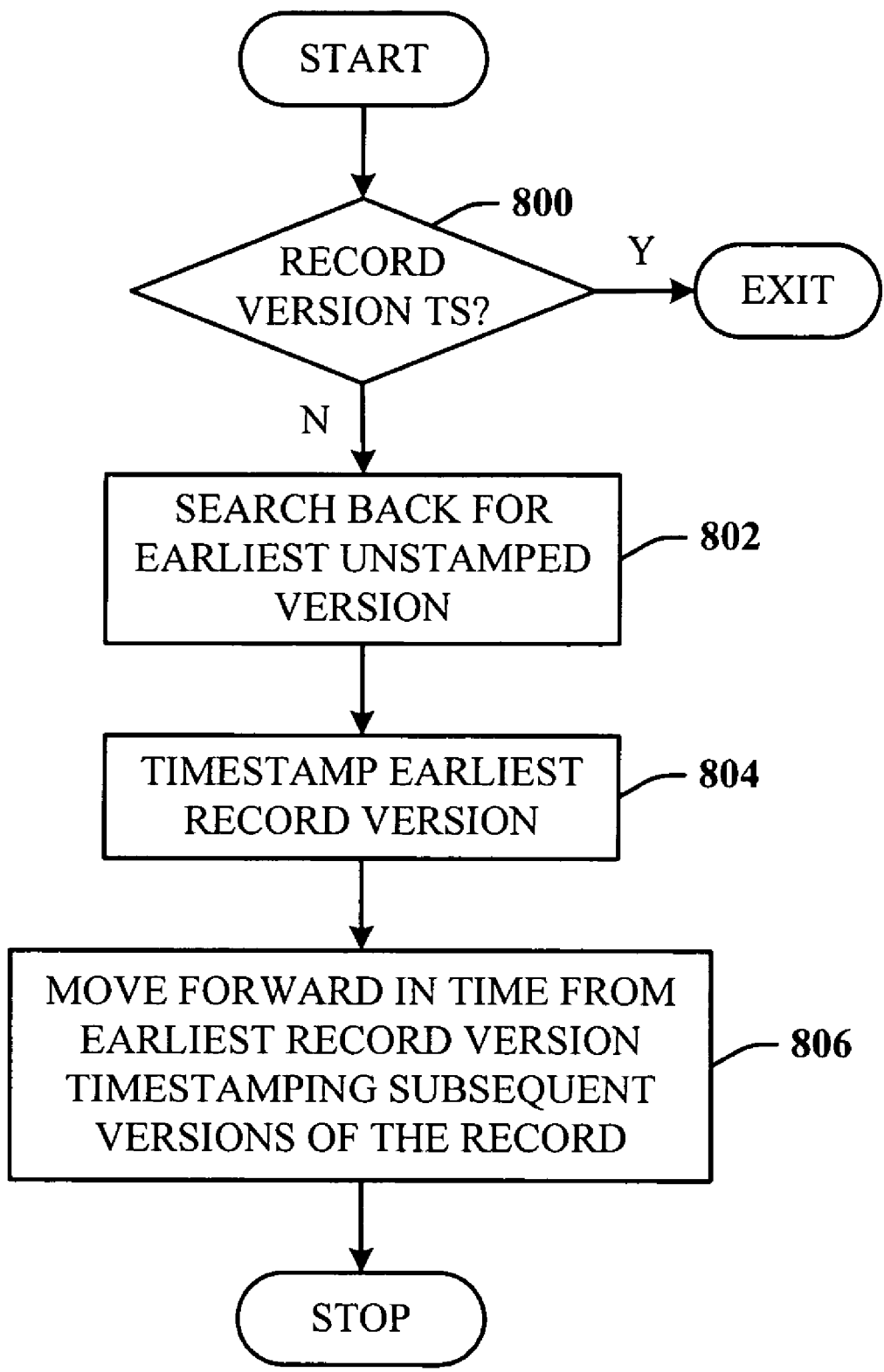
FIG. 8 illustrates a methodology of timestamping earlier record versions based on a timestamped record version in accordance with the invention.

Finally, it is useful to enforce an invariant that once a record version is timestamped, all other earlier versions of the record also are timestamped. FIG. 8 illustrates a methodology of timestamping earlier record versions based on a timestamped record version in accordance with the invention. This shortens any search for versions needing timestamping. Hence, at 800, the system checks if a record version is timestamped. If not, progress is to 802 where, when accessing record, a search back for the earliest unstamped version is performed. At 804, the earliest version is timestamped. At 806, moving forward in time from the earliest version, subsequent versions of the record are timestamped. At 800, if the record version is timestamped, the process exits.

Timestamping on Page Accesses

Not all record versions might be accessed by subsequent transactions. Thus, it is desirable for timestamping to occur at other points in execution of the database system. Since it is desired to keep accessing costs low, a separate access is not desired solely for the reason of performing timestamping. Hence, a "bulk" page operation represents another convenient and low cost opportunity to perform timestamping, since all data in the page typically has to be accessed in some way.

Figure 9:
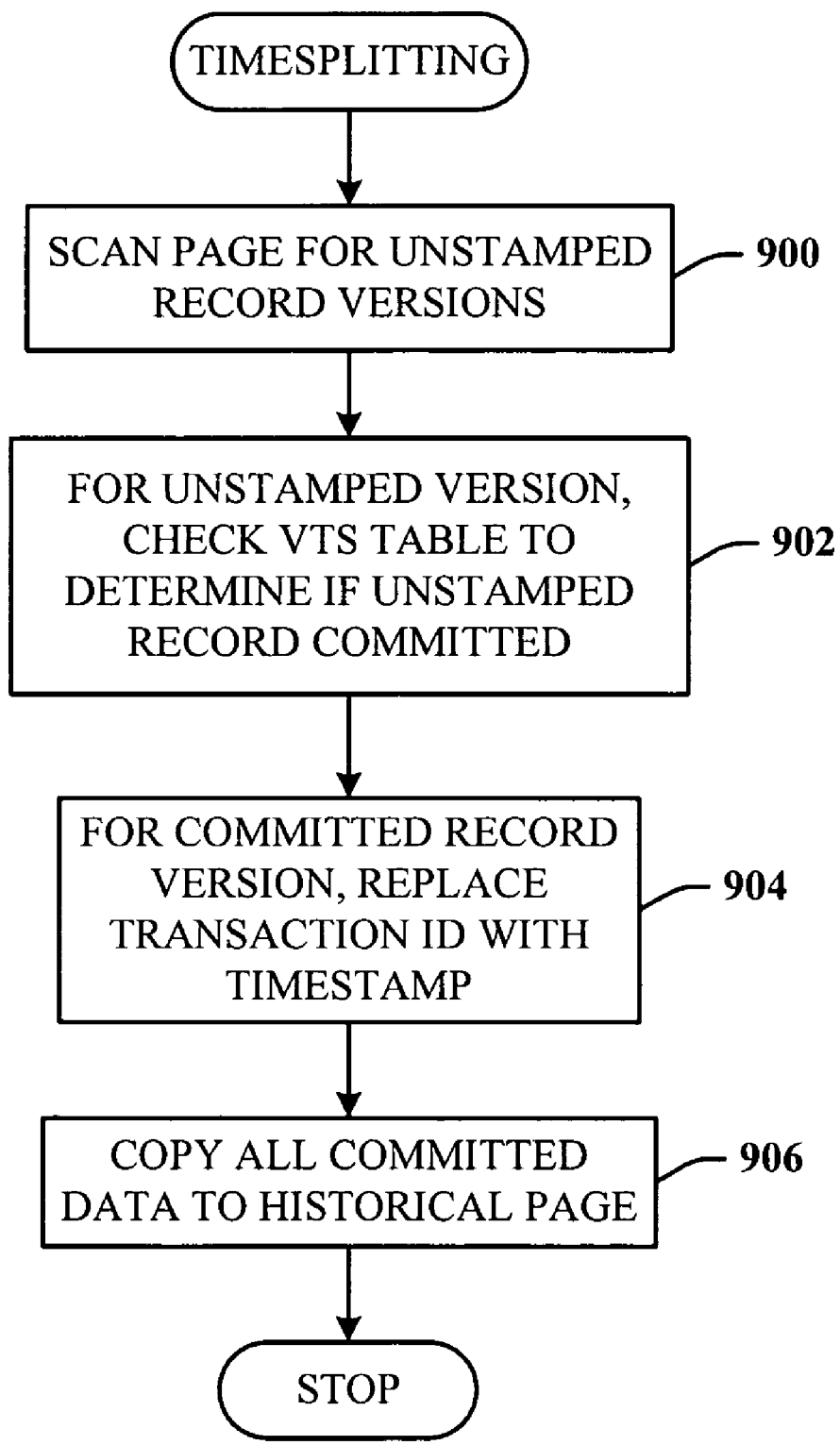
FIG. 9 illustrates a methodology for bulk page processing that utilizes page timesplitting in accordance with the invention.

FIG. 9 illustrates a methodology of bulk page processing that utilizes page timesplitting in accordance with the invention. In a first operation, timesplitting a page is usually performed using a split time that is the current time. At 900, the page is scanned to determine which record versions are unstamped. All timestamped versions are immediately seen to be committed. For each unstamped record version, the VTS table is checked to see whether the transaction ID in the record version is for a committed transaction, as indicated at 902. At 904, if the transaction is committed (the VTS table entry for the transaction ID has a non-zero timestamp), then the transaction ID is replaced by the timestamp. Now timesplitting activity copies all committed data to the historical page, as indicated at 906. Thus, the incremental cost of timestamping record versions during this activity is small, since it is desired to know whether record versions are committed or not in any event. Further, it is very useful to have all versions on "historical" pages timestamped because then these pages can be read-only, and never need locking.

Figure 10:
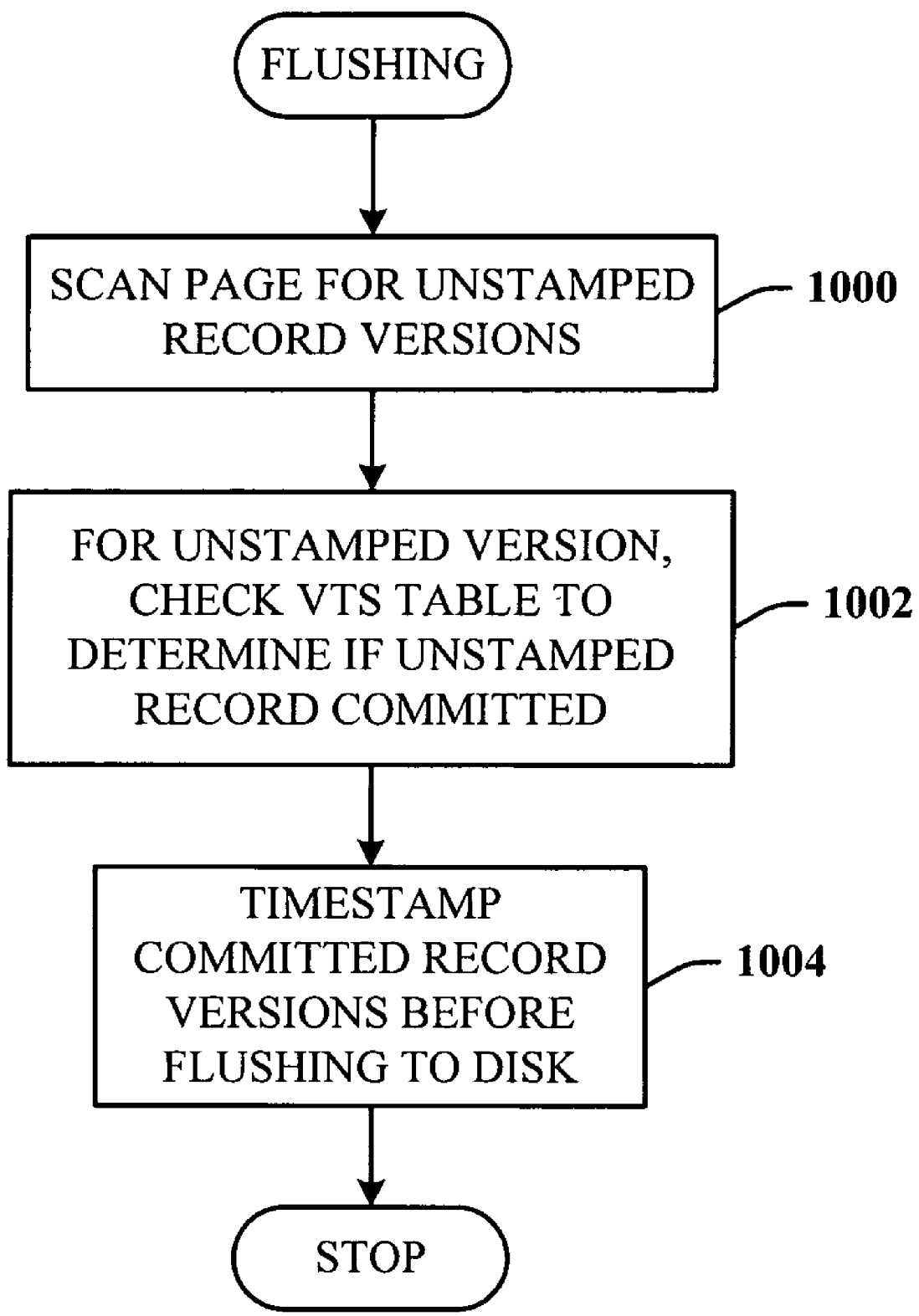
FIG. 10 illustrates a methodology of bulk page processing that flushes a page to disk.

FIG. 10 illustrates a second methodology of bulk page processing that flushes a page to disk. As performed in the timesplitting operation, the page is scanned looking for untimestamped record versions, as indicated at 1000. When an unstamped record version is found, the VTS is checked to determine whether the unstamped record version is committed, as indicated at 1002. If an unstamped version is committed, this requires it to be timestamped before flushing the page to disk, as indicated at 1004. Record versions of uncommitted transactions will be timestamped eventually at a later time. This approach has the benefit of having the timestamping become immediately stable.

Figure 11:
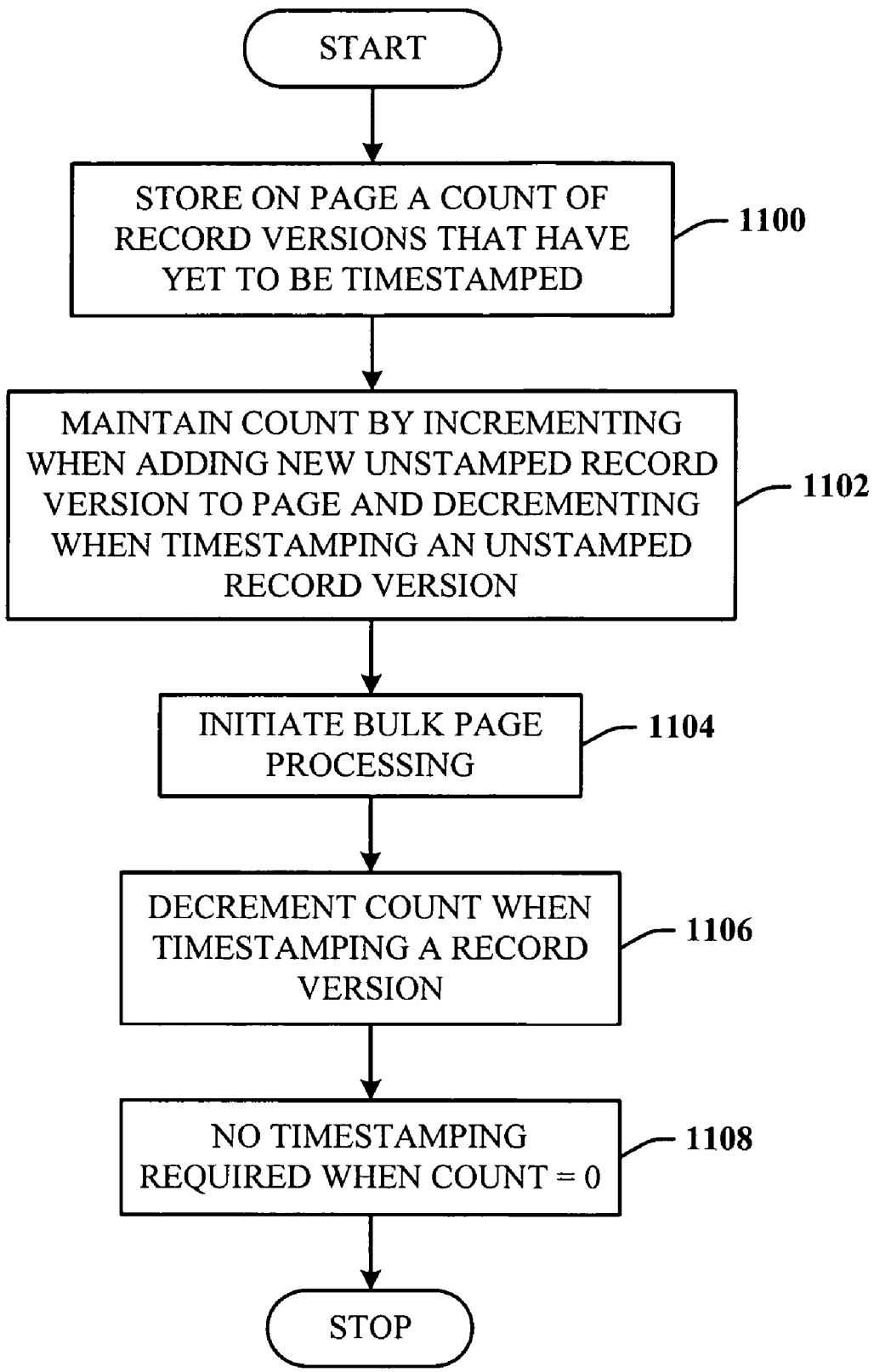
FIG. 11 illustrates a methodology for avoiding unnecessary checking of record versions in accordance with the subject invention.

FIG. 11 illustrates a methodology for avoiding unnecessary checking of record versions in accordance with the subject invention. Even for the bulk page operations, it is desired to avoid checking for versions to timestamp. Prior to performing bulk page processing, a count of the record versions that have yet to be timestamped is stored on the page, as indicated at 1100. This count is maintained by incrementing the count whenever adding a new unstamped record version to the page and by decrementing the count whenever timestamping an as yet untimestamped record version, as indicated at 1102. At 1104, bulk page operations are initiated. At 1106, the count is decremented whenever timestamping a record version. At 1108, if the count is zero, there is no timestamping needed on the page. This can be exploited whenever the count goes to zero during bulk page processing.

Figure 12:
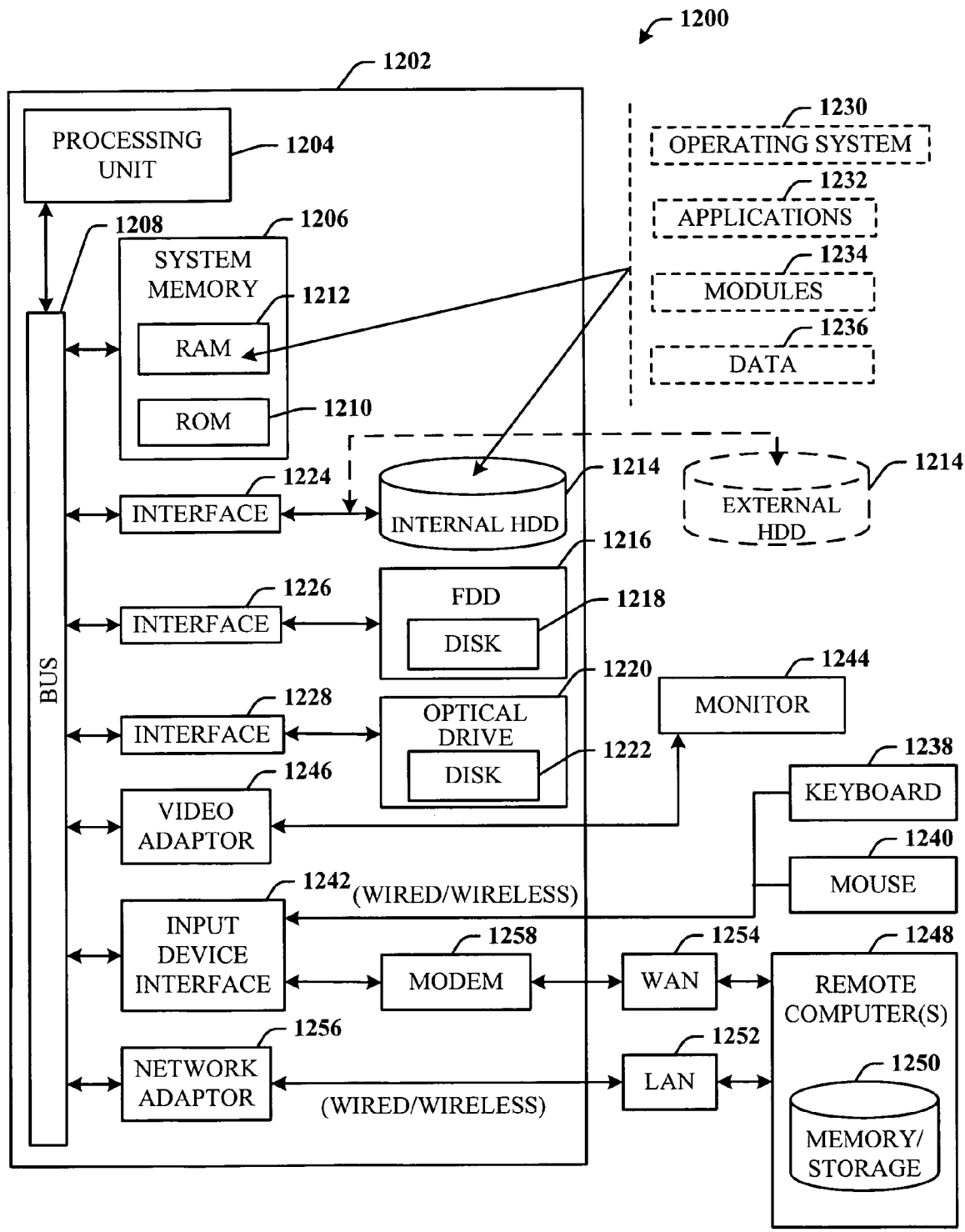
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.)

to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
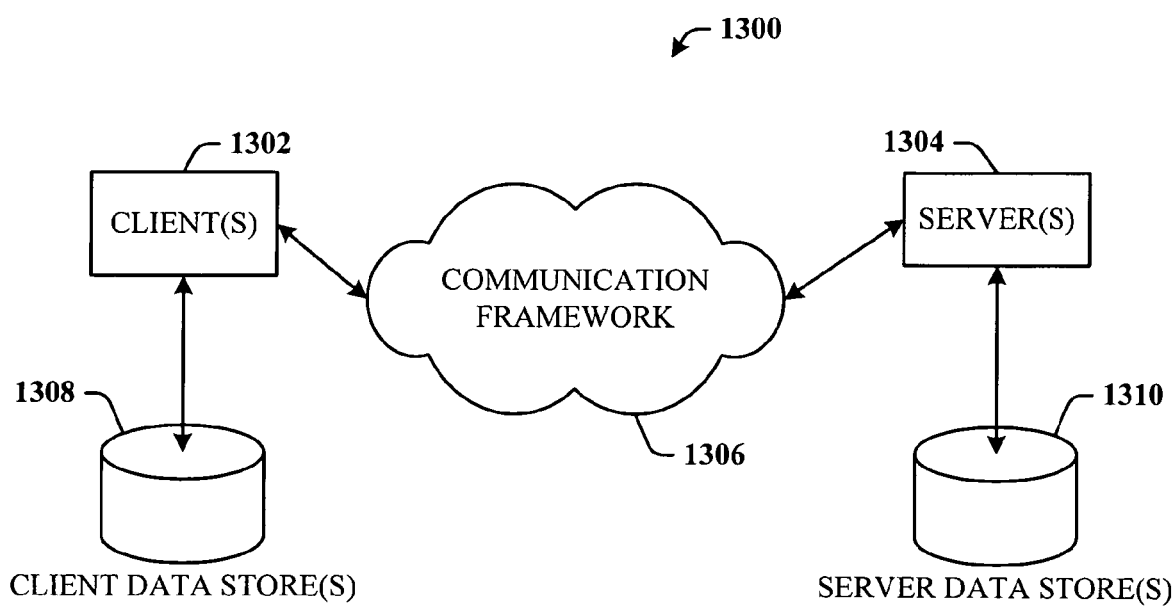
FIG. 13 illustrates a schematic block diagram of an exemplary computing environment in accordance with the subject invention.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates time stamping of database records, comprising:
a volatile memory that stores a volatile timestamp table which includes a mapping of timestamp information to a transaction ID, active versions of a persistent timestamp table, the transaction ID identifies a database transaction of a database and associated with all record versions touched by the database transaction, the volatile timestamp table stores an active portion of a persistent timestamp table that includes a mapping of a transaction ID to the timestamp information;
reference count data that is stored in the volatile timestamp table in association with the transaction ID and the mapped timestamp information, the reference count data indicates a number of record versions touched by the database transaction without timestamps, the reference count data is updated according to a timestamp operation, the timestamp operation replaces the transaction ID associated with an encountered non-time stamped record version with the mapped timestamp information; and
a checkpoint component that processes at least one checkpoint to provide a technique for verifying that timestamped records have been written to the database and that garbage collection of the persistent timestamp table can be performed; a transaction entry is deleted from both the volatile timestamp table and the active portion of the persistent timestamp table, the transaction entry is deleted from both the volatile timestamp table and the active portion of the persistent timestamp table when a redo recovery scan point is greater than a log sequence number of a corresponding volatile timestamp table entry as a function of an output of the checkpoint component.

2. The system of claim 1, further comprising a reference counting component that interfaces to the volatile memory to facilitate at least one of incrementing and decrementing the reference count data in response to the timestamp operation.

3. The system of claim 1, the checkpoint component interfaces to the volatile memory to perform the checkpoint processing which ensures that the timestamp information is persisted in record versions updated by a transaction before the timestamp information is deleted from the persistent timestamp table.

4. The system of claim 1, the reference count data is utilized to facilitate garbage collection in a persistent timestamp table.

5. The system of claim 1, wherein the reference count data is associated in the volatile timestamp table with at least one of the timestamp information, a transaction ID, and the log sequence number.

6. The system of claim 1, further comprising a page that is stored in the volatile memory and which includes a count of unstamped record versions stored on the page to facilitate bulk page operations.

7. The system of claim 1, wherein a log sequence number of a current end of a log is requested when the reference count data is zero, and the log sequence number value is stored in the volatile table in association with the mapping.

8. The system of claim 1, further comprising a component that compares the redo recovery scan point against the log sequence number to determine if the redo recovery scan point is greater than the log sequence number.

9. A computer-readable storage having computer-executable instructions for performing a method of timestamping in a transaction time database, the method comprising:
storing a mapping of timestamp information and a transaction ID of a database transaction in a volatile timestamp table of a volatile memory, the volatile timestamp stores an active portion of a persistent timestamp table that includes the mapping;
storing reference count information in the volatile memory in association with the mapping, the reference count information indicates record versions without timestamps updated by the database transaction;
accessing the reference count information to facilitate garbage collection in the persistent timestamp table, reference count information is accessed as part of a an access grouping such that multiple accesses occur at one time in a similar manner;

processing a checkpoint to provide a technique for verifying that timestamped records have been written to the database and that garbage collection of the persistent timestamp table can be performed; and verifying that timestamped records have been written to the database in accordance with the provided technique;

collecting a value of a redo recovery scan point and a value of a log sequence number of a corresponding volatile timestamp table entry;

and collecting garbage of the persistent timestamp table such that a transaction entry is deleted from both the volatile timestamp table and the active portion of the persistent timestamp table when a redo recovery scan point is greater than log sequence number of a corresponding volatile timestamp table entry as a function of an output of processing at least one checkpoint.

10. The computer-readable storage of claim 9, the method further comprising the acts of:

determining that the volatile timestamp table lacks a transaction ID; and in response thereto, setting associated reference count information to a value that persists a corresponding entry in the persistent timestamp table.

11. The computer-readable storage of claim 9, the method further comprising the acts of:

marking versions of a database record with the transaction ID; and thereafter, replacing the transaction ID with the timestamp information.

12. The computer-readable storage of claim 9, the method further comprising timestamping untimestamped data of a page.

13. The computer-readable storage medium of claim 12, the method further comprising the acts of:

timestamping record versions transmitted to a historical page during a timesplit process; and timestamping all committed record versions of a page when flushing the page to a disk.

14. The computer-readable storage medium of claim 9, the method further comprising accessing the volatile timestamp table using a hash code that accesses multiple entries having a same hashed transaction ID.

15. The computer-readable storage medium of claim 9, the method further comprising the acts of:

requesting a log sequence number of the current end of a log when the reference count information is zero; and storing the log sequence number value in the volatile timestamp table in association with the mapping.

16. The computer-readable storage medium of claim 9, the method further comprising deleting a transaction entry from both the persistent timestamp table and the volatile timestamp table when a redo recovery scan point is greater than a log sequence number of a corresponding volatile timestamp entry.

17. The computer-readable storage medium of claim 9, the method further comprising performing checkpoint processing by, checking the volatile timestamp table for entries having reference count information that is zero and having log sequence number values that are less than a redo recovery scan start log sequence number; and removing the entries from the volatile timestamp table and deleting the entries from the persistent timestamp table.

18. The computer-readable storage medium of claim 9, removing records from the persistent timestamp table is based at least in part on the reference count information and a result of the processed checkpoint.

19. The computer-readable storage medium of claim 9, accessing the reference count information to facilitate garbage collection in the persistent timestamp table comprises:

identifying at least one untimestamped record version;

checking the volatile timestamp table to determine whether the unstamped record version is committed; and timestamping the committed record version.

20. The computer-readable storage medium of claim 9, accessing the reference count information to facilitate garbage collection in the persistent timestamp table comprises:

scanning a page;

determining record versions that are unstamped as a function of a result of the page scanning;

checking the volatile timestamp table to determine if the transaction ID in an unstamped record version is for a committed transaction if it is determined that there is an unstamped record version;

replacing the transaction ID with a timestamp if it is determined that the transaction ID is for a committed transaction; and timestamping activities copies of all committed data to a historical page.

21. A method, comprising:

retaining a volatile timestamp table which includes a mapping of timestamp information to a transaction ID, active versions of a persistent timestamp table, the transaction ID identifies a database transaction of a database and associated with all record versions touched by the database transaction, the volatile timestamp table stores an active portion of a persistent timestamp table that includes a mapping of a transaction ID to the timestamp information;

interfacing to the volatile memory to facilitate at least one of incrementing and decrementing the reference count data in response to the timestamp operation;

obtaining reference count data that is stored in the volatile timestamp table in association with the transaction ID and the mapped timestamp information, the reference count data indicates a number of record versions touched by the database transaction without timestamps, the reference count data is updated according to a timestamp operation, the timestamp operation replaces the transaction ID associated with an encountered non-time stamped record version with the mapped timestamp information; and processing at least one checkpoint to provide a technique for verifying that timestamped records have been written to the database and that garbage collection of the persistent timestamp table can be performed; and verifying that timestamped records have been written to the database in accordance with the provided technique;

collecting a value of a redo recovery scan point and a value of a log sequence number of a corresponding volatile timestamp table entry; and collecting garbage of the persistent timestamp table such that a transaction entry is deleted from both the volatile timestamp table and the active portion of the persistent timestamp table when a redo recovery scan point is greater than log sequence number of a corresponding volatile timestamp table entry as a function of an output of processing at least one checkpoint.

* * * * *